(12) United States Patent
Ciesielczyk et al.

(10) Patent No.: US 11,962,138 B2
(45) Date of Patent: Apr. 16, 2024

(54) CABLE SUPPORT TIE

(71) Applicant: PREFORMED LINE PRODUCTS CO., Mayfield Village, OH (US)

(72) Inventors: Benjamin Franklin Ciesielczyk, Madison, OH (US); Cameron Joseph Clines, Chagrin Falls, OH (US); Jacob Jeffrey Palmer, Chesterland, OH (US); Bruno Maiano, Chevreuse (FR)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/299,121

(22) PCT Filed: Dec. 5, 2019

(86) PCT No.: PCT/US2019/064634
§ 371 (c)(1),
(2) Date: Jun. 2, 2021

(87) PCT Pub. No.: WO2020/118023
PCT Pub. Date: Jun. 11, 2020

(65) Prior Publication Data
US 2022/0077670 A1 Mar. 10, 2022

(30) Foreign Application Priority Data
Dec. 6, 2018 (FR) ........................ 1872426

(51) Int. Cl.
*H02G 3/00* (2006.01)
*H02G 3/32* (2006.01)
(Continued)

(52) U.S. Cl.
CPC ............... *H02G 3/263* (2013.01); *H02G 3/32* (2013.01); *H02G 7/10* (2013.01); *H02G 7/05* (2013.01);
(Continued)

(58) Field of Classification Search
CPC ............ H02G 3/263; H02G 3/32; H02G 7/10; H02G 7/05; H02G 7/06; H02G 7/08
See application file for complete search history.

(56) References Cited

U.S. PATENT DOCUMENTS

| 953,951 A | 4/1910 | Hubbard | |
| 2,202,538 A * | 5/1940 | Selquist | ................ H01B 17/22 174/DIG. 12 |

(Continued)

FOREIGN PATENT DOCUMENTS

| GB | 950831 A | 2/1964 |
| GB | 1512493 A | 6/1978 |

(Continued)

OTHER PUBLICATIONS

Corresponding International Patent Application No. PCT/US2019/064634, International Preliminary Report on Patentability, dated Jun. 8, 2021.

(Continued)

*Primary Examiner* — Tan Le
(74) *Attorney, Agent, or Firm* — Cooper Legal Group, LLC (57) ABSTRACT

A support device for supporting a cable includes a central support portion having a first side and a second side. The support device also includes a first leg portion extending between a first end and a second end, the first leg portion having a first helical winding. The support device also includes a second leg portion extending between a third end and a fourth end, the second leg portion having a second helical winding. The support device further includes a hanger portion attached to the central support portion. The hanger portion includes structure that cooperates with an associated attachment structure. The first leg portion is attached to the central support portion and the second leg portion is attached to the central support portion. The first helical winding and the second helical winding are configured to receive the cable.

20 Claims, 7 Drawing Sheets

(51) Int. Cl.
*H02G 7/10* (2006.01)
*H02G 7/05* (2006.01)
*H02G 7/06* (2006.01)
*H02G 7/08* (2006.01)
*H02G 7/14* (2006.01)

(52) U.S. Cl.
CPC ............. *H02G 7/06* (2013.01); *H02G 7/08* (2013.01); *H02G 7/14* (2013.01)

(56) References Cited

U.S. PATENT DOCUMENTS

| | | | |
|---|---|---|---|
| 2,230,611 A | | 2/1941 | Coffin |
| 3,633,252 A | * | 1/1972 | Williams .............. F16G 11/143 248/51 |
| 3,664,010 A | * | 5/1972 | D'Agati ................ H01B 17/22 174/79 |
| 2013/0061512 A1 | | 3/2013 | Baker, III |

FOREIGN PATENT DOCUMENTS

| | | |
|---|---|---|
| GB | 2411690 A | 7/2005 |
| GB | 2411690 A | 9/2005 |
| JP | 2001231136 A | 8/2001 |

OTHER PUBLICATIONS

Corresponding International Patent Application No. PCT/US2019/064634, International Search Report, dated Jan. 28, 2020.
Corresponding International Patent Application No. PCT/US2019/064634, Written Opinion of the International Searching Authority, dated Jan. 28, 2020.
UKIPO Search Report to Corresponding Application No. GB2306530. 3; 10 Pgs.; May 26, 2023.

* cited by examiner

CABLE SUPPORT TIE

CROSS REFERENCE TO RELATED APPLICATIONS

This application claims priority to both France Non-Provisional Patent Application No. FR1872426 filed on Dec. 6, 2018, and PCT application PCT/US2019/064634, WO2020118023, both entitled "CABLE SUPPORT TIE" which are hereby incorporated by reference herein.

TECHNICAL FIELD

The instant disclosure is directed toward a device used to hang cables. For example, the instant disclosure is directed toward a device that supports a cable from a bracket.

BACKGROUND

Cable support ties may be used for hanging cables as they are run from central stations to end user devices. The cable support ties can be attached to a structure and maintain a position of the cable.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In some examples, a support device for supporting a cable includes a central support portion having a first side and a second side. The support device also includes a first leg portion extending between a first end and a second end, the first leg portion having a first helical winding. The support device further includes a second leg portion extending between a third end and a fourth end, the second leg portion having a second helical winding. The second end of the first leg portion is attached to the first side of the central support portion and the third end of the second leg portion is attached to the second side of the central support portion. The first helical winding and the second helical winding are configured to receive the cable to support the cable. The central support portion includes a structure that cooperates with an associated attachment structure. A plane that is perpendicular to a line that is tangent to an apex of the central support portion does not intersect both the first side and the second side where the first side extends between the second end of the first leg portion and the apex and the second side extends between the third end of the second leg portion and the apex.

In some examples, a support device for supporting a cable includes a central support portion having a first side and a second side. The support device also includes a first leg portion extending between a first end and a second end, the first leg portion having a first helical winding. The support device also includes a second leg portion extending between a third end and a fourth end, the second leg portion having a second helical winding. The support device further includes a hanger portion attached to the central support portion. The hanger portion includes structure that cooperates with an associated attachment structure. The first leg portion is attached to the central support portion and the second leg portion is attached to the central support portion. The first helical winding and the second helical winding are configured to receive the cable.

In some examples, a support device for supporting a cable includes a helical winding extending between a first end and a second end, the helical winding defining an axial opening. The support device also includes a hanger portion. The hanger portion includes a central hanger portion. The hanger portion also includes a first leg attached to and extending away from the central hanger portion. The hanger portion further includes a second leg attached to and extending away from the central hanger portion. The central hanger portion includes a structure that cooperates with an associated attachment structure. The first leg and the second leg are configured to be received within the axial opening such that the hanger portion supports the helical winding, and the helical winding is configured to receive the cable.

In some examples, a support device for supporting a cable includes a central support portion having a first side and a second side. The support device also includes a first leg portion extending between a first end and a second end, the first leg portion having a first helical winding. The support device further includes a second leg portion extending between a third end and a fourth end, the second leg portion having a second helical winding. The second end of the first leg portion is attached to the first side of the central support portion and the third end of the second leg portion is attached to the second side of the central support portion. The first helical winding and the second helical winding are configured to receive the cable to support the cable. The central support portion includes a structure that cooperates with an associated attachment structure. When the support device is in a first position, a plane that is perpendicular to a line segment between the second end and the third end intersects both the first side and the second side where the first side extends between the second end of the first leg portion and an apex of the central support portion and the second side extends between the third end of the second leg portion and the apex of the central support portion. When the support device is in a second position, the plane does not intersect both the first side and the second side.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Figure 1:
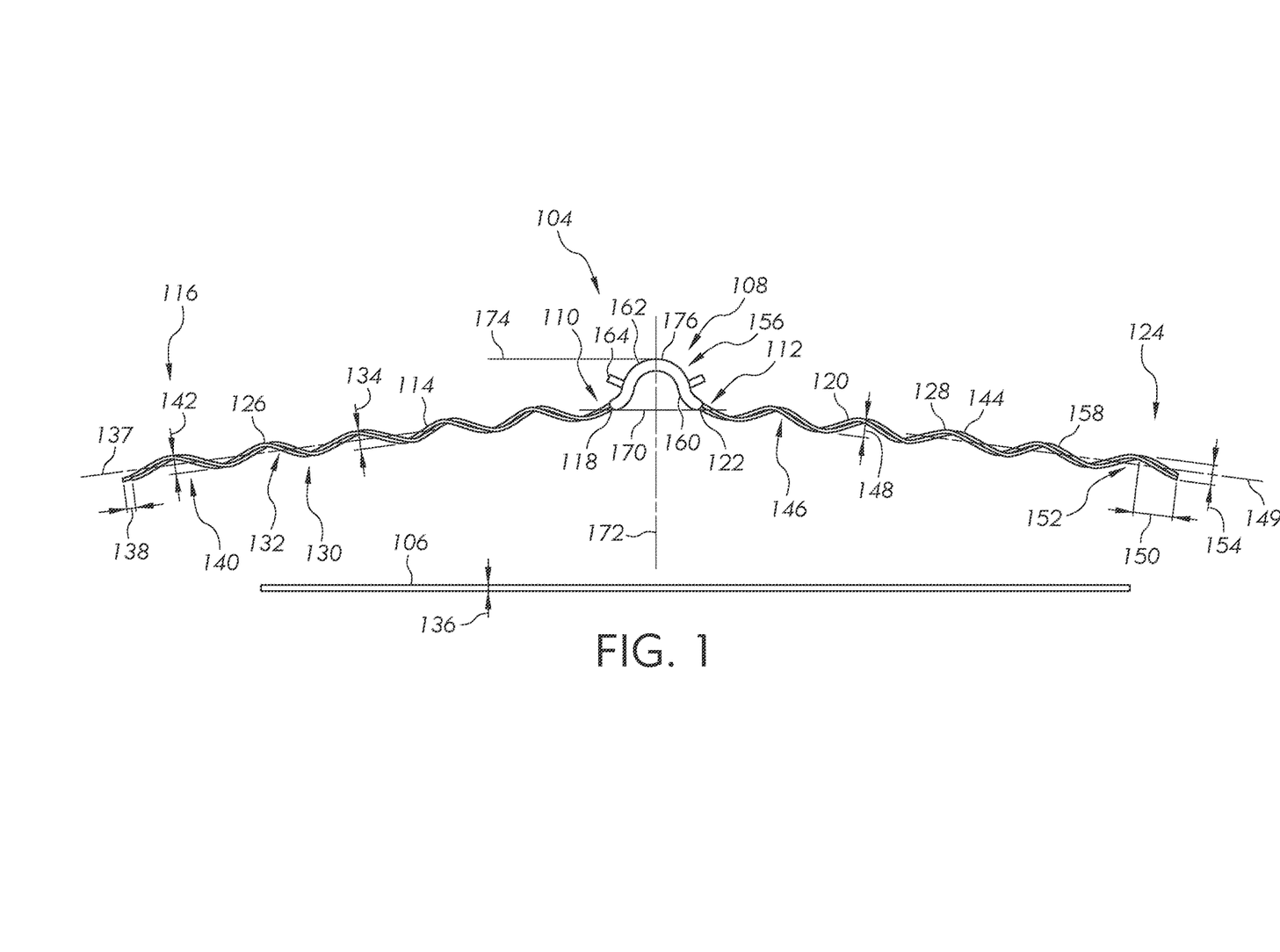
FIG. 1 is a perspective view of a support device, according to one aspect.

Referring to FIG. 1, it is often beneficial to enable a suspended connection for a cable from an associated attachment structure 100 (shown in FIGS. 2 and 5), such as in the installation of telecommunication systems. In some examples, the associated attachment structure 100 can include a metal crossarm that defines one or more openings from which a support device 104 can interact with the associated attachment structure 100. When installed, the support device 104 is used to support a cable 106 in the air, (e.g., above a surface). For the purposes of this disclosure, the term "cable" can include, but is not limited to, monofilament wire, stranded wire, multiple wires, fiber optic cable, overhead shielded wire, conductors, optical ground wire (OPGW), and all-dielectric self-supporting fiber optic cable (ADSS). The remainder of the disclosure will use the term "cable" that is intended to encompass at least the above classifications.

In some examples, the support device 104 includes a central support portion 108 having a first side 110 and a second side 112. In the shown example, the first side 110 and the second side 112 are on opposing sides of the central support portion 108. The support device 104 also includes a first leg portion 114 extending between a first end 116 and a second end 118. The second end 118 is attached to the first side 110 of the central support portion 108. The support device 104 further includes a second leg portion 120 extending between a third end 122 and a fourth end 124. The third end 122 of the second leg portion 120 is attached to the second side 112 of the central support portion 108. In some examples, the first end 116 and the fourth end 124 are located at the ends of the support device 104. The first end 116 and the fourth end 124 can be located at opposite ends of the support device 104.

As shown, the first leg portion 114 has a first helical winding 126 and the second leg portion 120 has a second helical winding 128. The first helical winding 126 and the second helical winding 128 are configured to receive the cable 106 in order to support the cable in the air (e.g., above a surface).

In some examples, a first portion 130 of the first helical winding 126 between the first end 116 and the second end 118 defines a first axial opening 132 having a first diameter 134. The first axial opening 132 can have a consistent first diameter 134 for some or all of the length between the first end 116 and the second end 118. A second portion 138 of the first helical winding 126 at the first end 116 can be bent to form an end relief to reduce or eliminate the possibility of a cut wire end (e.g., having a sharp edge at the first end 116) making contact with a jacket of the cable 106. The end relief bends the first end 116 away from a centerline 137 along which the first leg portion 114 extends between the first end 116 and the second end 118 (e.g., and thus away from the cable 106).

In some examples, the first portion 130 of the first helical winding 126 between the first end 116 and the second end 118 defines the first axial opening 132 having the first diameter 134. The first diameter 134 can be similar to, or even smaller than an outside diameter 136 of the cable 106 so that the cable 106 will fit snugly within the first helical winding 126. The second portion 138 of the first helical winding 126 at the first end 116 defines a second axial opening 140 having a second diameter 142 that is greater than the first diameter 134. The greater second diameter 142 can reduce or eliminate wear on the cable 106 as the cable 106 moves with respect to the first helical winding 126.

In some examples, a first portion 144 of the second helical winding 128 between the third end 122 and the fourth end 124 defines a third axial opening 146 having a third diameter 148. The third axial opening 146 can have a consistent third diameter 148 for some or all of the length between the third end 122 and the fourth end 124. A second portion of the second helical winding 128 at the fourth end 124 can be bent to form an end relief to reduce or eliminate the possibility of a cut wire end (e.g., having a sharp edge at the fourth end 124) making contact with a jacket of the cable 106. The end relief bends the fourth end 124 away from a centerline 149 along which the second leg portion 120 extends between the third end 122 and the fourth end 124 (e.g., and thus away from the cable 106).

In some examples, the first portion 144 of the second helical winding 128 between the third end 122 and the fourth end 124 defines the third axial opening 146 having the third diameter 148. A second portion 150 of the second helical winding 128 at the fourth end 124 defines a fourth axial opening 152 having a fourth diameter 154 that is greater than the third diameter 148. In some examples, the first diameter 134 can be equal to the third diameter 148. In some examples, the second diameter 142 can be equal to the fourth diameter 154.

In at least some of the previous examples, the bent helical windings forming end reliefs and the varied diameters can be beneficial to reduce or eliminate a particular type of wear on the cable 106. For example, the greater first diameter 134 and fourth diameter 154 help to keep the first end 116 and the fourth end 124 from contacting the cable 106 and thereby inhibit wear, rubbing, piercing, etc. of the cable 106 by the first end 116 and the fourth end 124 as the cable 106 moves after installation. The greater diameters 134, 154 can be described as a flare-out and also helps prevent stripping of a jacket that may be included on the exterior portion of the cable 106.

Figure 5:
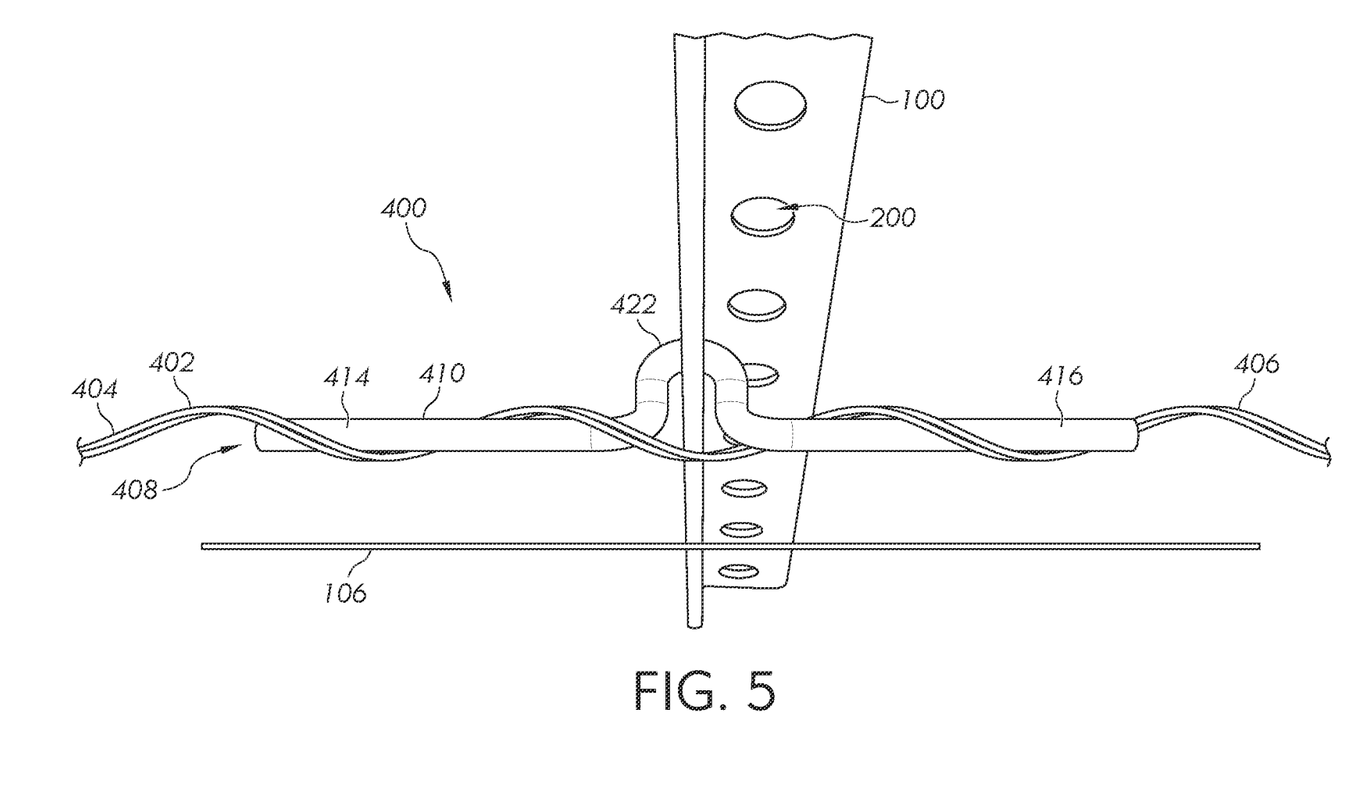
FIG. 5 is a perspective view of the support device of FIG. 4.

The central support portion 108 includes a structure 156 that cooperates with the associated attachment structure 100. In some examples, the structure 156 includes an arc shape, as shown in FIG. 1. Of course, myriad shapes, sizes, and proportions of arcs are contemplated and can be included as the structure 156. In some examples, the structure 156 can include a loop or a portion of a loop as shown in FIG. 5. Similar to the arc shape, myriad shapes, sizes, and proportions of loops are contemplated and can be included as the structure 156. Other forms of the structure 156 are also contemplated, such as hooks, clips, snaps, etc.

Returning to FIG. 1, in some examples, a line 172 that passes through the central support portion 108 and is perpendicular to a line 170 that intersects the second end 118 and the third end 122 does not intersect either the first leg portion 114 or the second leg portion 120. As such, the structure 156 does not include an arc or a loop that crosses over itself at the central support portion 108. This lack of cross-over enables the support device 104 to be passed into the associated attachment structure 100 without the need to rotate the entire support device 104 about an axis that is substantially parallel to the central axis of the cable 106. In some examples, at installation, a simple translational insertion motion parallel to the central axis of the cable 106 in addition to a vertical movement of the support device 104 is sufficient to attach the support device 104 to the associated attachment structure. Conceptually, the support device 104 remains substantially within a plane during the installation process without the need for rotation.

In some examples, a plane (also represented by line 172 that extends into and out of FIG. 1) that is perpendicular to a line 174 that is tangent to an apex 176 of the central support portion 108 does not intersect both the first side 110 and the second side 112 where the first side 110 extends between the second end 118 of the first leg portion 114 and the apex 176 and the second side 112 extends between the third end 122 of the second leg portion 120 and the apex 176.

Remaining with FIG. 1, the central support portion 108, the first leg portion 114, and the second leg portion 120 are formed from a continuous wire or wires 158. Of course, the central support portion 108, the first leg portion 114, and the second leg portion 120 can also be formed from a set of continuous wires 158. In other words, a single length of continuous wire or wires 158 can extend from the first end 116, through the central support portion 108 to form the structure 156, and on to the fourth end 124. In some examples, the central support portion 108 can be located at or near the midpoint between the first end 116 and the fourth end 124.

In some examples, the support device 104 can include a thimble 160 that at least partially surrounds the top portion 162 of the structure 156. The thimble 160 can be metallic and can be formed in generally the same shape as the top portion 162 of the structure 156. In some examples, the thimble 160 includes a plastic material. In some examples, the thimble 160 is curved, similar to the curve profile of the structure 156 as shown in FIG. 1. In some examples, the thimble 160 is a U-shaped channel that defines an open space at a top side of the thimble 160. In this example, the open space is on the outside diameter of the curved thimble 160. As such, the thimble 160 can be translated into position at least partially surrounding the top portion 162 of the structure 156 as the top portion 162 translates into the U-shaped channel. The thimble 160 can include tabs 164 that can be bent over the open space after the thimble 160 is applied to the top portion 162. The tabs 164 can reduce or eliminate relative motion between the continuous wire(s) 158 and the thimble 160. The thimble 160 can protect the continuous wire or wires 158 from abrasion with the associated attachment structure 100.

Figure 2:
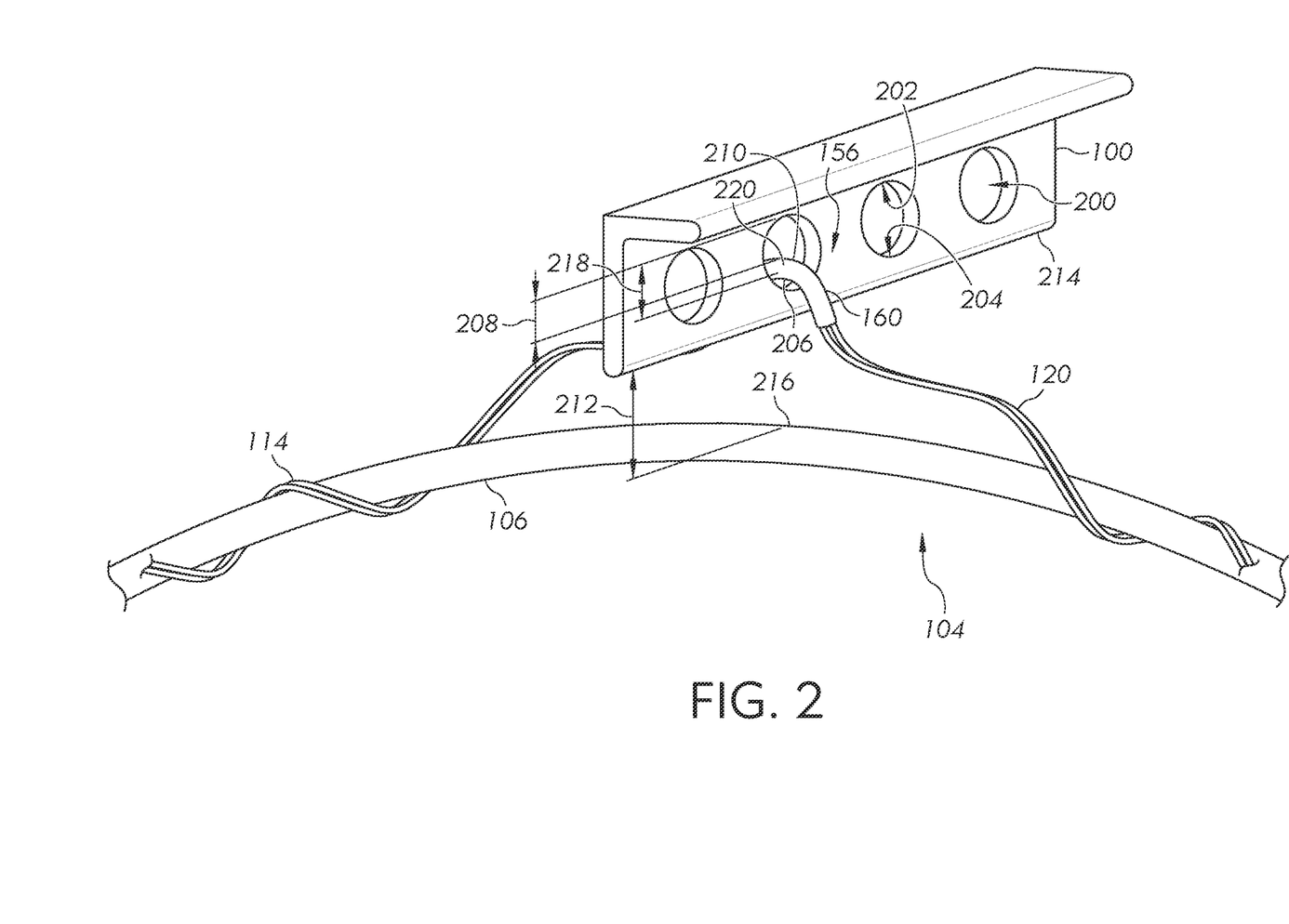
FIG. 2 is a perspective view of a support device and an associated attachment structure.

Referring to FIG. 2, the associated attachment structure 100 defines an opening 200 between an upper opening wall 202 of the associated attachment structure 100 and a lower opening wall 204 of the associated attachment structure 100. Each of the openings 200 shown in FIG. 2 can be identical to each of the other openings 200 (e.g., circular openings). In some examples, the openings 200 can include different profile shapes. The structure 156 cooperates with the associated attachment structure 100 by being inserted into the opening 200 such that a bottom surface 206 of the thimble 160 rests upon the lower opening wall 204. A distance 208 between a top surface 210 of the thimble 160 and the upper opening wall 204 is less than a distance 212 between a bottom surface 214 of the associated attachment structure 100 and a top surface 216 of the cable 106 when the cable 106 is received within first helical winding 126 and the second helical winding 128.

In other words, when the support device 104 is at a maximum vertical deflection within the opening 200, the cable 106 remains a distance away from the associated attachment structure 100. This is because the top surface 216 of the cable 106 is located farther from the bottom surface 214 of the associated attachment structure 100 than the top surface 210 of the thimble 160 is located from the upper opening wall 204 of the associated attachment structure 100. This separation distance, even at maximum deflection helps to decrease or eliminate the possibility of wear, rubbing, piercing etc. of the cable 106 on the associated attachment structure 100 as the cable 106 moves after installation. Movement of the cable 106 up and down in a cyclical pattern is often termed "galloping."

The same design and manufacturing parameters can be implemented for a support device 104 that does not include a thimble 160. For example, a distance 218 between a top surface 220 of the structure 156 and the upper opening wall 204 is less than a distance 212 between a bottom surface 214 of the associated attachment structure 100 and a top surface 216 of the cable 106 when the cable 106 is received within first helical winding 126 and the second helical winding 128.

Returning to FIG. 1, in some examples, the first leg portion 114 extends away and down (e.g., to the left in FIG. 1) from the central support portion 108 such that a line 170 that intersects the second end 118 and the third end 122 does not intersect the first end 116. In some examples, the first leg portion 114 and the second leg portion 120 are not parallel to each other. In some examples, the first leg portion 114 and the second leg portion 120 can extend in a downward direction (e.g., to the left in FIG. 1) away from the central support portion 108 that can mimic the sinusoidal pattern of a flexible member supported at various points along its length. In other words, the first leg portion 114 and the second leg portion 120 can extend along a sinusoidal curve as the continuous wire(s) 158 extend away from the central support portion 108. As such, the centerlines 137, 149 are not necessarily linear, and can be curvilinear in some examples. In some examples, the first leg portion 114 and the second leg portion 120 do not form a line that is tangent to the structure 156 or any conceptual part of the structure 156 that can be extended to form a full loop or circle.

Returning to FIG. 2, the installation process of the support device 104 with the associated attachment structure 100 includes simply inserting either the first end 116 or the fourth end 124 of the support device 104 into an opening 200 and centering the support device 104 with respect to the associated attachment structure 100 such that the structure 156 is located (at least partially) within the opening 200. Then, the first leg portion 114 and the second leg portion 120 are individually wrapped around a length of the cable 106 that is to be suspended in the air (e.g., a length of ADSS).

Figure 3:
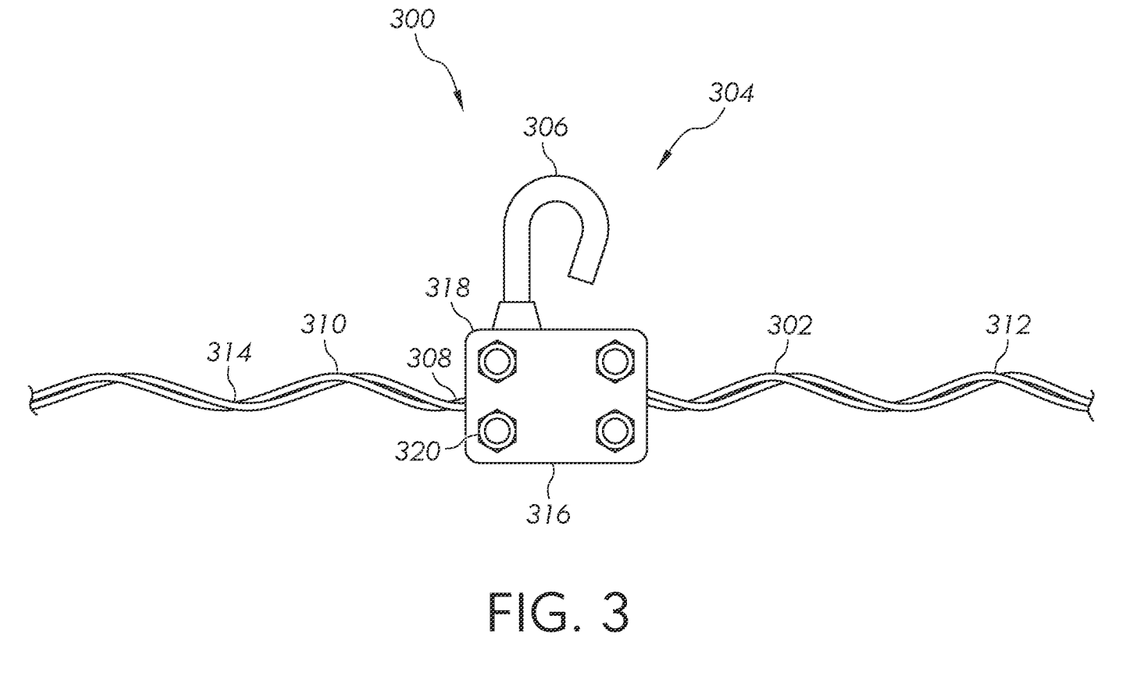
FIG. 3 is a perspective view of a support device having a hanger portion.

Referring to FIG. 3, a support device 300 can include a helical tie 302, which can also be termed a "helical winding." A hanger portion 304 can be attached to the pre-formed helical tie 302. The hanger portion 304 can be constructed in any suitable manner including, but not limited to, cast, forged, molded, welded, etc. Any suitable attachment method between the pre-formed helical tie 302 and the hanger portion 304 can be used including, but not limited to, crimping, bolting, overmolding, etc. In some examples, a length of the pre-formed helical tie 302 near the center of the support device 300 can be formed by cabling. For the purposes of this disclosure, cabling is intended to indicate that the individual wire(s) of the pre-formed helical tie 302 are wound tightly together and do not define an empty space or open channel at its interior. The cabled portion of the pre-formed helical tie 302 can help ensure a rigid connection between the pre-formed helical tie 302 and the hanger portion 304.

In some examples, the hanger portion 304 includes a hook 306 that cooperates with the opening 200 defined by the associated attachment structure 100 (shown in FIGS. 2 and 5).

In some examples, a central support portion 308, a first leg portion 310, and a second leg portion 312 are formed from a continuous wire or wires 314. In some examples, the hanger portion 304 and the continuous wire(s) 314 are constructed of different materials. For example, the continuous wire 314 is formed of metal while the hanger portion 304 can be a plastic material.

In some examples, the hanger portion 304 comprises a first piece 316 and a second piece 318 connected by a threaded fastener 320 to at least partially surround the central support portion 308 and limit motion of the hanger portion 304 relative to the central support portion 308. As shown in FIG. 3, the second piece 318 is hidden behind the first piece 316. In some examples, the central support portion 308 is sandwiched between the first piece 316 and the second piece 318. The threaded fastener 320 can urge the first piece 316 toward the second piece 318 to apply a force to the central support portion 308 to secure the continuous wire(s) 314 to the hanger portion 304.

After the hanger portion 304 is attached to the pre-formed helical tie 302, the assembly is hooked through an opening 200 of the associated attachment structure 100 to complete installation. The cable 106 (shown in FIG. 2) is then hung by wrapping a length of the first leg portion 310 and the second leg portion 312 around the cable 106.

Figure 4:
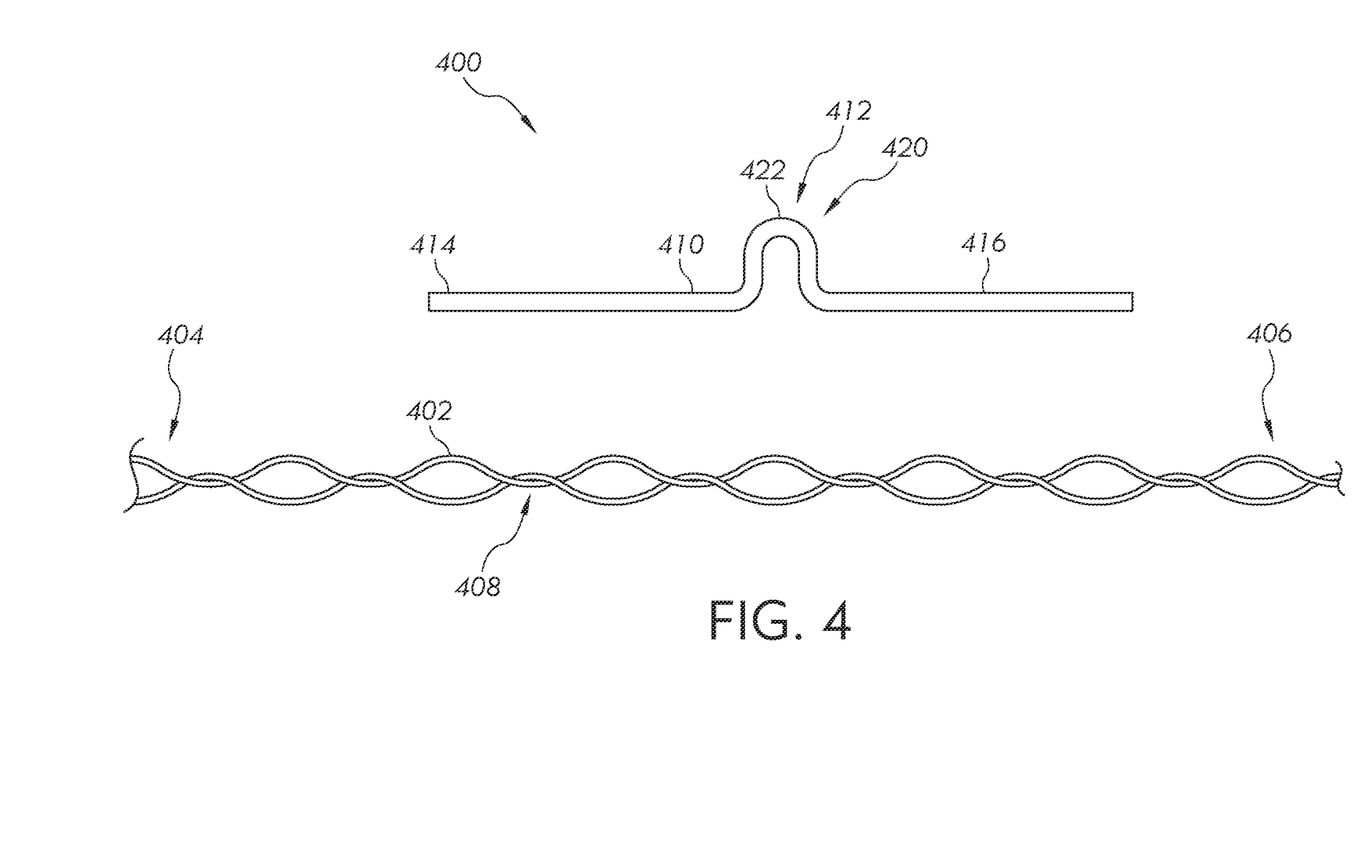
FIG. 4 is an exploded perspective view of a support device having a hanger portion configured to be received within an axial opening.

Referring to FIGS. 4 and 5, a support device 400 includes a helical winding 402 extending between a first end 404 and a second end 406. The helical winding 402 defines an axial opening 408 such that the helical winding 402 is configured to receive the cable 106 (shown in FIG. 2). The support device 400 also includes a hanger portion 410. The hanger portion 410 includes a central hanger portion 412. In some examples, the central hanger portion 412 can be located near a midpoint of the hanger portion 410. The hanger portion 410 includes a first leg 414 attached to the central hanger portion 412, and a second leg 416 attached to the central hanger portion 412. The first leg 414 and the second leg 416 extend away from the central hanger portion 412.

In some examples, the first leg 414 is parallel to the second leg 416. In some examples, the first leg 414 is colinear to the second leg 416 and the first leg 414 and the second leg 416 are oriented 180° from one another to extend in opposite directions relative to the central hanger portion 412. The first leg 414 and the second leg 416 are configured to be received within the axial opening 408 such that the hanger portion 410 supports the helical winding 402 as shown in FIG. 5.

Remaining with FIG. 4, the central hanger portion 412 includes a structure 420 that cooperates with the associated attachment structure 100. In some examples, the structure 420 includes an arc-shaped segment 422 configured to cooperate with the opening 200 (shown in FIG. 5) of the associated attachment structure 100. Other forms of the structure 420 are also contemplated, such as hooks, clips, snaps, etc. In some examples, the first leg 414 and the second leg 416 extend horizontally when the central hanger portion 412 is hung from the associated attachment structure 100. FIG. 5 shows the openings 200 on an upper, horizontal portion of the associated attachment structure 100. It is to be understood that the openings 200 can also be located on the vertical section of the associated attachment structure 100, such as where the arc-shaped segment 422 passes through the associated attachment structure 100. A similar arrangement is shown in FIG. 2.

Referring to FIG. 5, during installation, an installer places the hanger portion 410 into the opening 200 of the associated attachment structure 100, centering the hanger portion 410 with respect to the metal crossarm 100 such that the arc-shaped segment 422 is located (at least partially) within the opening 200. The pre-formed helical winding 402 is then centered onto the hanger portion 410 and wrapped onto the hanger portion 410. It is to be understood that the helical winding 402 is longer than the hanger portion 410 such that the cable 106 (e.g., ADSS) can be wrapped by the first end 404 and the second end 406 of the helical winding 402 to secure the cable 106 to the hanger portion 410.

Figure 6:
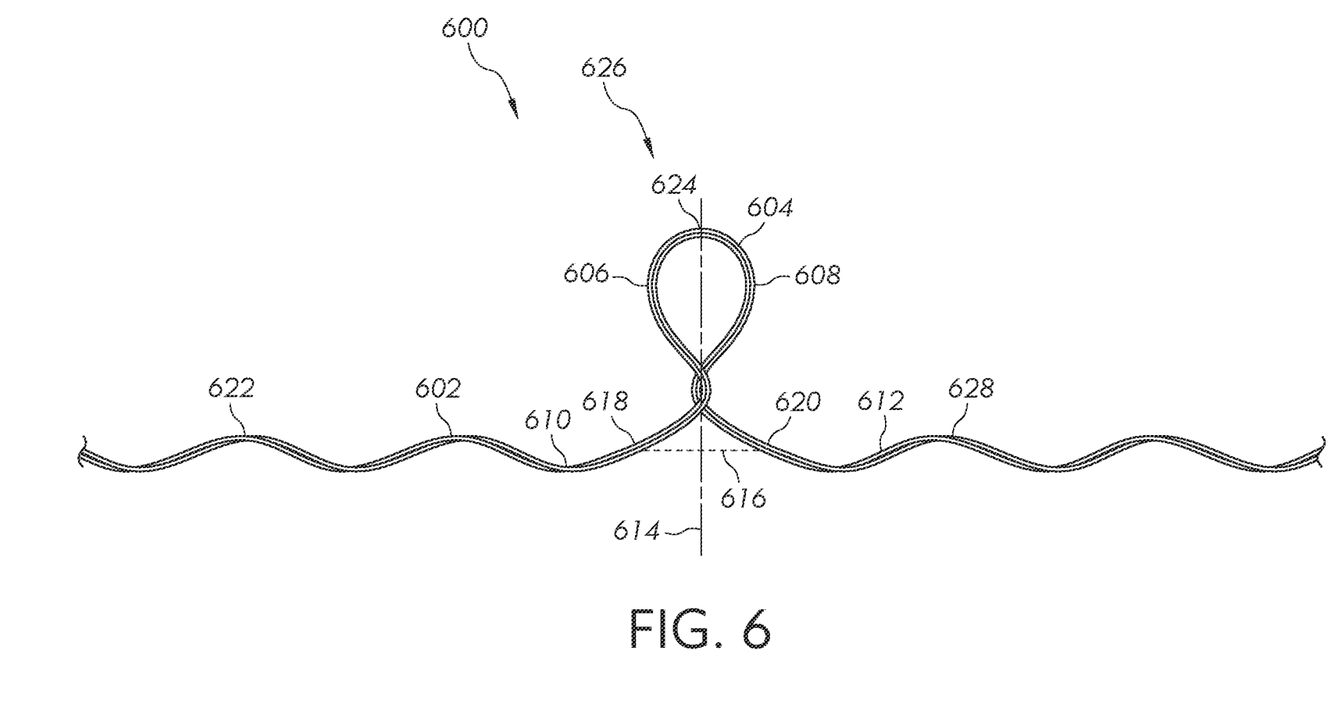
FIG. 6 is a perspective view of a support device having a loop structure, the support device in a first position.

Referring to FIG. 6, a support device 600 in a first position includes a helical winding 602. The helical winding 602 includes a loop 604 at a position close to a mid-point of the helical winding 602. The helical winding 602 includes a first side 606 and a second side 608. It is to be understood that a wire or wires 610 of the first side 606 can be continuous with a wire or wires 612 of the second side 608. However, the portion of the wires 610 approaching the loop 604 from the first side 606 do not loop around the individual wires 612 of the second side 608 as the loop 604 is made. As can be seen in FIG. 6, the wires 610 from the first side 606 are in front of the wires 612 (e.g., closer to the viewer of FIG. 6) of the second side 608 at all portions of the loop 604. As such, the installation of the support device 600 onto the associated attachment structure 100 is accomplished by simply moving one or the other of the first side 606 and the second side 608 into one opening 200 of the associated attachment structure 100 and then moving the helical winding 602 to center the loop 604 at the opening 200. Then, each of the first side 606 and the second side 608 are wrapped around the cable 106 as shown in several of the previous figures.

When the support device 600 is in the first position as shown in FIG. 6, a plane 614 (shown extending into and out of FIG. 6) that is perpendicular to a line segment 616 between a second end 618 and a third end 620 intersects both the first side 606 and the second side 608. In some examples, the first side 606 extends between a second end 618 of the first leg portion 622 and an apex 624 of a central support portion 626. The second side 608 extends between the third end 620 of the second leg portion 628 and the apex 624 of the central support portion 626.

Figure 7:
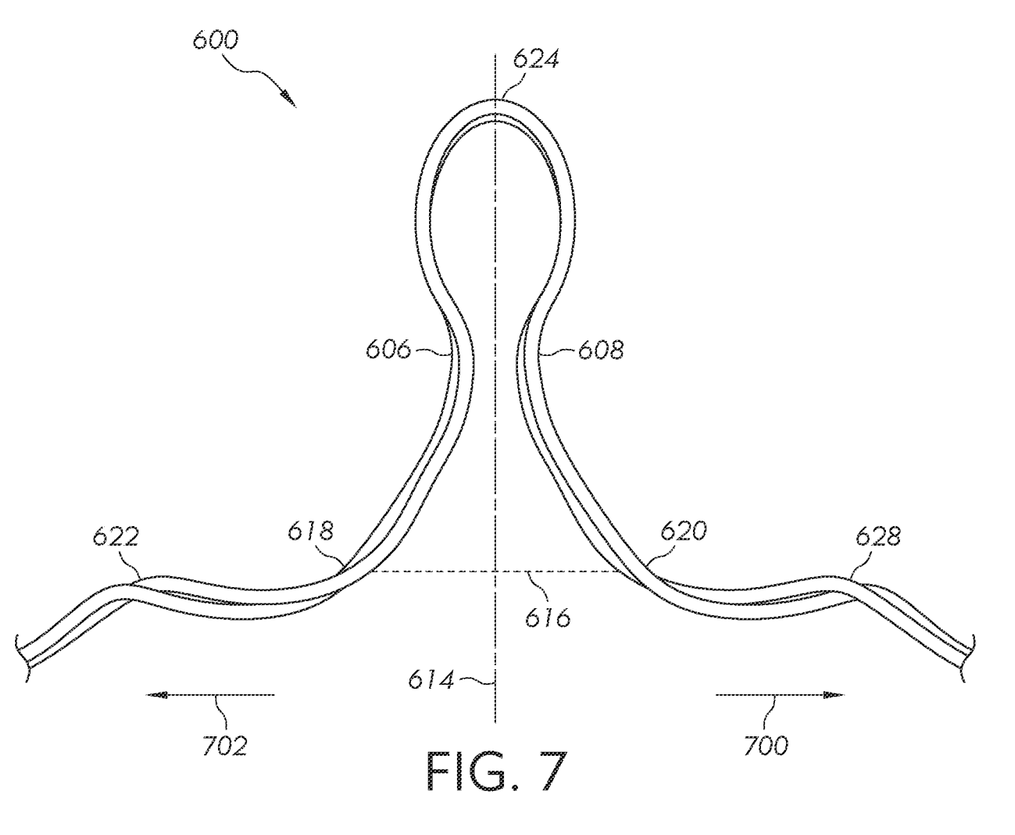
FIG. 7 is similar to FIG. 6 showing a second position.

Referring to FIG. 7, the support device 600 is shown in a second position. In some examples, moving the support device 600 from the first position to the second position can be as simple as applying a force urging the first leg portion 622 away from the second leg portion 628, the force represented by arrow 700 and arrow 702. In some examples, the support device 600 reverts or "springs" back to the first position when the force is removed. When the support device 600 is in the second position, the plane 614 (extending into and out of FIG. 7) does not intersect both the first side 606 and the second side 608.

Returning to FIG. 6, as has been previously discussed, the portion of the wires 610 approaching the loop 604 from the first side 606 do not loop around the individual wires 612 of the second side 608 as the loop 604 is made. This lack of cross-over enables the support device 600 to be passed into the associated attachment structure 100 without the need to rotate the entire support device 600 about an axis that is substantially parallel to the central axis of the cable 106. In some examples, at installation, a simple translational insertion motion parallel to the central axis of the cable 106 in addition to a vertical movement of the support device 600 is sufficient to attach the support device 600 to the associated attachment structure. Conceptually, the support device 600 can remain substantially within a plane during the installation process without the need for rotation.

The lack of cross-over noted above enables the support device 600 to be selectively moved between the first position (shown in FIG. 6) and the second position (shown in FIG. 7) to attach the support device 600 to the associated attachment structure 100.

The apparatus and methods of the present disclosure can include several benefits. In some examples, the presently described apparatus and methods do not require rotation of the support device about an axis parallel to the central axis of the cable or other axes that may be non-parallel to the central axis of the cable. This can be a benefit because the space in which the support device is hung is often limited, with separate additional cables being suspended on either side of the support device, making the rotation, and thus proper installation of previous designs less than optimal.

Another potential benefit can include having a one-piece support device. In the field, installation technicians can enjoy more successful installations in less time with less effort when compared to many known, more complicated, support devices that include two or more pieces that must be assembled at the installation location.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A support device for supporting a cable, the support device comprising:
    a central support portion having a first side and a second side, wherein the central support portion comprises a structure that cooperates with an associated attachment structure;
    a first leg portion extending between a first end and a second end, the first leg portion having a first helical winding;
    a second leg portion extending between a third end and a fourth end, the second leg portion having a second helical winding; and,
    a thimble attached to the structure, wherein:
       the second end of the first leg portion is attached to the first side of the central support portion and the third end of the second leg portion is attached to the second side of the central support portion,
       the first helical winding and the second helical winding are configured to receive the cable to support the cable, and
       a plane that is perpendicular to a line that is tangent to an apex of the central support portion does not intersect both the first side and the second side where the first side extends between the second end of the first leg portion and the apex and the second side extends between the third end of the second leg portion and the apex.

2. The support device of claim 1, wherein the central support portion, the first leg portion, and the second leg portion are formed from a continuous wire.

3. The support device of claim 1, wherein:
    a portion of the first helical winding at the first end is bent away from a centerline along which the first leg portion extends between the first end and the second end to form an end relief.

4. The support device of claim 3, wherein,
    a portion of the second helical winding at the fourth end is bent away from a centerline along which the second leg portion extends between the third end and the fourth end to form a second end relief.

5. The support device of claim 1, wherein the plane is perpendicular to a line that intersects the second end and the third end.

6. The support device of claim 1, wherein the thimble comprises a tab configured to secure the thimble to the structure.

7. The support device of claim 1, wherein:
the associated attachment structure defines an opening between an upper opening wall of the associated attachment structure and a lower opening wall of the associated attachment structure,
the structure cooperates with the associated attachment structure by being inserted into the opening such that a bottom surface of the thimble rests upon the lower opening wall, and
a distance between a top surface of the thimble and the upper opening wall is less than a distance between a bottom surface of the associated attachment structure and a top surface of the cable when the cable is received within the first helical winding and the second helical winding.

8. The support device of claim 1, wherein the structure comprises a portion of a loop.

9. The support device of claim 1, wherein the structure comprises an arc shape.

10. The support device of claim 1, wherein the first leg portion extends away and down from the central support portion such that a line that intersects the second end and the third end does not intersect the first end.

11. A support device for supporting a cable, the support device comprising:
a central support portion having a first side and a second side;
a first leg portion extending between a first end and a second end, the first leg portion having a first helical winding; and
a second leg portion extending between a third end and a fourth end, the second leg portion having a second helical winding, wherein:
the second end of the first leg portion is attached to the first side of the central support portion and the third end of the second leg portion is attached to the second side of the central support portion,
the first helical winding and the second helical winding are configured to receive the cable to support the cable,
the central support portion comprises a structure that cooperates with an associated attachment structure,
a plane that is perpendicular to a line that is tangent to an apex of the central support portion does not intersect both the first side and the second side where the first side extends between the second end of the first leg portion and the apex and the second side extends between the third end of the second leg portion and the apex,
the associated attachment structure defines an opening between an upper opening wall of the associated attachment structure and a lower opening wall of the associated attachment structure,
the structure cooperates with the associated attachment structure by being inserted into the opening such that a bottom surface of the structure rests upon the lower opening wall, and
a distance between a top surface of the structure and the upper opening wall is less than a distance between a bottom surface of the associated attachment structure and a top surface of the cable when the cable is received within the first helical winding and the second helical winding.

12. The support device of claim 11, wherein the central support portion, the first leg portion, and the second leg portion are formed from a continuous wire.

13. The support device of claim 11, wherein:
a portion of the first helical winding at the first end is bent away from a centerline along which the first leg portion extends between the first end and the second end to form an end relief.

14. The support device of claim 13, wherein,
a portion of the second helical winding at the fourth end is bent away from a centerline along which the second leg portion extends between the third end and the fourth end to form a second end relief.

15. The support device of claim 11, wherein the plane is perpendicular to a line that intersects the second end and the third end.

16. The support device of claim 11, wherein the structure comprises a portion of a loop.

17. The support device of claim 11, wherein the structure comprises an arc shape.

18. The support device of claim 11, wherein the first leg portion extends away and down from the central support portion such that a line that intersects the second end and the third end does not intersect the first end.

19. A support device for supporting a cable, the support device comprising:
a central support portion having a first side and a second side, wherein the central support portion comprises a structure that cooperates with an associated attachment structure;
a first leg portion extending between a first end and a second end, the first leg portion having a first helical winding;
a second leg portion extending between a third end and a fourth end, the second leg portion having a second helical winding; and
a thimble attached to the structure and comprising a bendable tab, wherein:
the second end of the first leg portion is attached to the first side of the central support portion and the third end of the second leg portion is attached to the second side of the central support portion,
the first helical winding and the second helical winding are configured to receive the cable to support the cable, and
a plane that is perpendicular to a line that is tangent to an apex of the central support portion does not intersect both the first side and the second side where the first side extends between the second end of the first leg portion and the apex and the second side extends between the third end of the second leg portion and the apex.

20. The support device of claim 19, wherein:
the associated attachment structure defines an opening between an upper opening wall of the associated attachment structure and a lower opening wall of the associated attachment structure,
the structure cooperates with the associated attachment structure by being inserted into the opening such that a bottom surface of the thimble rests upon the lower opening wall, and
a distance between a top surface of the thimble and the upper opening wall is less than a distance between a bottom surface of the associated attachment structure and a top surface of the cable when the cable is received within the first helical winding and the second helical winding.

* * * * *